2,830,061
Patented Apr. 8, 1958

2,830,061

ALKYLSULFONYL-6-DIHYDROSAFROLE AND INTERMEDIARY COMPOUNDS

Edward A. Prill, Yonkers, N. Y., assignor to Boyce Thompson Institute for Plant Research, Inc., a corporation of New York No Drawing. Application November 29, 1954
Serial No. 471,879

2 Claims. (Cl. 260—340.5)

This invention relates to organic compounds and has for its object the provision of organic compounds of the sulfone class represented by the formula

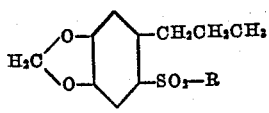

wherein R is a hydrocarbon radical such as n-octyl, insecticidal compositions of the compounds, their use as a synergist for pyrethrins, allethrin and other pyrethrin-like insecticides, and a process of producing the compounds. The invention also provides the compound dihydrosafrole-6-sulfinic acid which may be represented by the formula

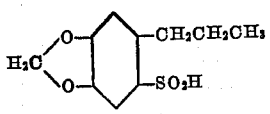

and its alkali metal salts which are useful as intermediary products in the preparation of the sulfones of this invention.

The compounds of the invention were prepared in the following manner: To a solution of 8.4 ml. of concentrated sulfuric acid in 116 ml. of water there was added 9 g. of freshly distilled 6-aminodihydrosafrole (a known compound) forming a suspension of the sulfate salt of this amine. This was cooled in an ice bath and was diazotised by added sodium nitrite solution until the suspended sulfate salt was dissolved. The excess nitrous acid was then removed by adding sulfamic acid until the starch iodide test was negative. With continued cooling a cold dilute sulfuric acid (21 ml. concentrated acid plus 110 ml. water) was added and then sulfur dioxide was passed into the mixture until saturated. A copper paste (prepared from copper sulfate and zinc dust) was stirred into the mixture until nitrogen was no longer evolved. The mixture was then filtered and the dihydrosafrole-6-sulfinic acid was extracted from both the filtrate and the precipitate with ethyl ether. The combined ether extract was evaporated at room temperature, the residue neutralized with sodium carbonate solution and evaporated to dryness. The mass was then extracted with hot methanol. On concentration of the methanol extract the sodium salt of dihydrosafrole-6-sulfinic acid crystallized out as thin plate-like crystals. When tested with ferric chloride solution in dilute hydrochloric acid this compound gave a precipitate of the ferric salt which is a characteristic test for sulfinic acids.

A mixture of equimolar quantities of the above sodium salt of dihydrosafrole-6-sulfinic acid and n-octyl iodide in methanol solution was refluxed for several hours, sodium iodide being split out in the process. The methanol was then removed by distillation, the residue was dissolved in ethyl ether, the solution washed with aqueous sodium carbonate solution and dried over anhydrous sodium sulfate. On evaporation of the ether the residue consisted of the viscous oily compound of the formula

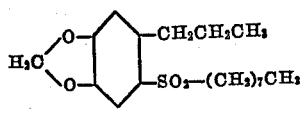

This compound was tested against house flies by the Peet-Grady method. The solvent for making the test solutions was a petroleum distillate containing 5% acetone. A solution containing 0.4 g. of the compound and 0.05 g. of pyrethrins per 100 ml. gave a kill of 77%. A solution containing 0.4 g. of the compound and 0.05 g. of allethrin per 100 ml. gave a kill of 57%. The official test insecticide (which contains 0.1 g. pyrethrins per 100 ml.) when tested at the same time gave a kill of only 40%.

The insecticidal activity of the compound has been demonstrated with solutions in petroleum distillates, but other formulations such as emulsions in water, solutions in liquefied gases such as dichlorodifluoromethane for use as aerosols, and impregnated dusts also may be used.

I claim:

1. The compound dihydrosafrole-6-sulfinic acid having the formula

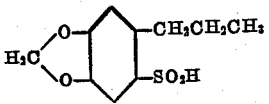

2. An alkali metal salt of dihydrosafrole-6-sulfinic acid.

References Cited in the file of this patent

UNITED STATES PATENTS

| 2,486,445 | Synerholm | Nov. 1, 1949 |
|---|---|---|
| 2,486,579 | Synerholm | Nov. 1, 1949 |

OTHER REFERENCES

Hickinbottom: Reactions of Organic Compounds, Longmans, Green and Co., New York (1948), page 433.